United States Patent [19]

House

[11] Patent Number: 5,271,343
[45] Date of Patent: Dec. 21, 1993

[54] PLANTER INSECTICIDE TUBE ALIGNMENT BRACKET

[76] Inventor: John L. House, P.O. Box 552, Oak Grove, La. 71263

[21] Appl. No.: 947,548

[22] Filed: Sep. 21, 1992

Related U.S. Application Data

[63] Continuation-in-part of Ser. No. 863,799, Apr. 6, 1992, abandoned.

[51] Int. Cl.$^5$ .............................................. A01C 15/00
[52] U.S. Cl. ........................................ 111/186; 111/80; 111/170
[58] Field of Search ............... 111/186, 180, 80, 129, 111/170; 403/13, 336, 398, 403, 231; 52/150–152, 146

[56] References Cited

U.S. PATENT DOCUMENTS

| | | | |
|---|---|---|---|
| 1,905,767 | 4/1933 | Traphagen | 111/186 |
| 1,906,351 | 5/1933 | White | 111/186 |
| 1,921,886 | 8/1933 | Kriegbaum et al. | 111/186 |
| 2,623,483 | 12/1952 | Stevenson | 111/186 |
| 2,861,527 | 11/1958 | Phillips | 111/186 |
| 3,888,446 | 6/1975 | O'Brien et al. | 408/292 |
| 3,891,332 | 6/1975 | Molyneux et al. | 403/13 |
| 4,388,878 | 6/1983 | Demzin | 111/186 |
| 4,424,757 | 1/1984 | Gibbens | 111/186 |
| 4,608,794 | 9/1986 | Delise | 403/231 |
| 5,025,736 | 6/1991 | Anderson | 111/188 |
| 5,033,398 | 7/1991 | Froc | 111/188 |
| 5,136,954 | 8/1992 | Fetaz et al. | 111/186 |

Primary Examiner—Randolph A. Reese
Assistant Examiner—Spencer Warnick
Attorney, Agent, or Firm—John M. Harrison

[57] ABSTRACT

A tube alignment bracket for mounting on or shaped integrally with the seed distribution tube of a seed planter to align the planter insecticide tube in close proximity to, and in a vertical plane with, the discharge opening of the seed distribution tube and insure that insecticide or fungicide dispensed through the insecticide tube is deposited in a furrow in close proximity to seeds expelled from the seed distribution tube. In a preferred embodiment the tube alignment bracket is characterized by a shaped plastic bracket plate having one end fitted with a tube mount and strengthened by a T-brace, the opposite end of which bracket plate is strapped to or formed integrally with the seed distribution tube. The tube mount is oriented to receive and position the insecticide tube in close, fixed proximity with respect to the discharge opening of the seed distribution tube.

4 Claims, 1 Drawing Sheet

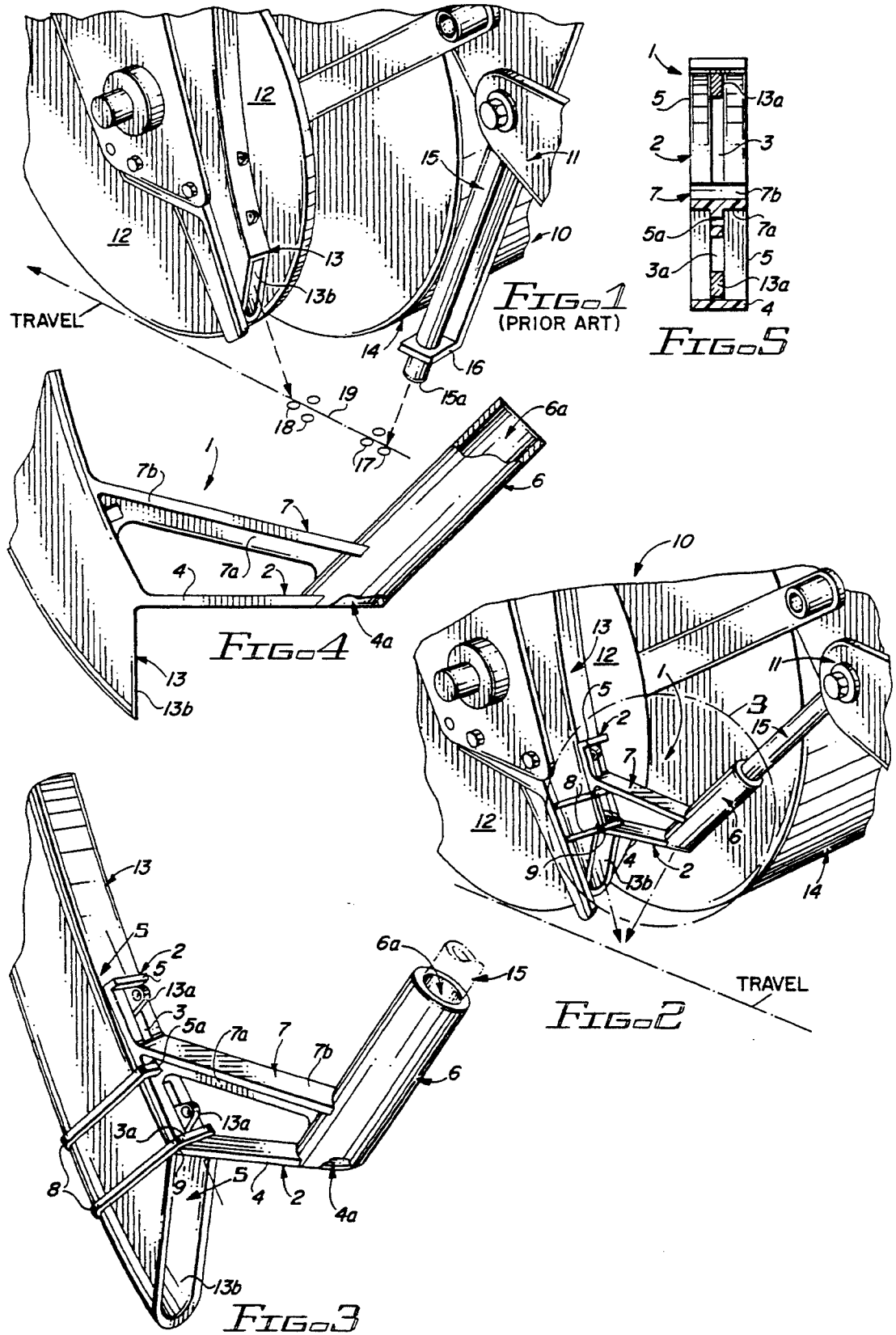

PLANTER INSECTICIDE TUBE ALIGNMENT BRACKET

BACKGROUND OF THE INVENTION

1. Cross-Reference to Related Applications

This application is a continuation-in-part of my copending U.S. patent application Ser. No. 07/863,799, filed Apr. 6, 1992 now abandoned.

2. Field of the Invention

Proper in-furrow insecticide/fungicide and seed placement is an important problem which faces growers during the planting season. The problem includes application of toxic systemic insecticides and/or fungicides in close proximity to seeds as the seeds are expelled in spaced relationship in furrows created by the seed planter, to minimize attack by organisms such as thrips. Proper placement of the insecticide/fungicide directly in the furrows is crucial to avoid environmental damage and effective location with respect to the seeds helps to avoid seed damage and positions the insecticide/fungicide in a position such that young emerging roots of the germinated seed are able to contact the treatment material, pick it up and translocate it. When the insecticide/fungicide is spaced too far from the seeds, the emerging roots are able to pick up less of the material, resulting in inadequate protection for the growing plant. It is accepted by experts in the agricultural field that either the tap root or the feeder roots springing from the germinating seeds must be in the insecticide/fungicide material to effect optimum protection of the plant.

It has also been found that streaking insecticide or fungicide in the field is environmentally abusive and a waste of money, since many of the insecticide/fungicide materials are toxic and expensive, making proper placement of the insecticide/fungicide in the furrows with respect to the seed at each seed deposition highly important. Improper seed-insecticide/fungicide placement results in the requirement of additional expensive folier application and increases the expense of the crop, as well as the risk to the environment.

Conventional planting devices are fitted with both seed distribution tubes and insecticide tubes, the seed distribution tubes being used to uniformly deposit seeds in spaced relationship in furrows created by the planter and the insecticide tubes utilized to distribute insecticide and/or fungicide in the furrows in close proximity to each seed before the seed and insecticide/fungicide are covered with earth by the planter. In a typical application, the seed and insecticide/fungicide are sufficiently spaced to optimize the desired protective effects of the insecticide/fungicide on the seeds and the plants emerging from the seeds. However, far too often the insecticide/fungicide is not accurately delivered to the furrows and may be spilled randomly in the earth adjacent to the furrows, where it presents a danger to the environment and fails to properly treat the germinating seeds.

3. Description of the Prior Art

An article entitled "Precision Placement of In-Furrow Insecticide Reduces Costs" in the "Cotton Farming" magazine, 35th Anniversary Issue, dated March 1992, describes a pipe welded to the bracket that holds the insecticide granule tube of a planter, to extend the insecticide tube and facilitate deposition of insecticide granules closer to the ground near the bottom of the furrows. Various other attachments are known in the art for use with seed planters in applying fertilizer and the like in furrows during planting. U.S. Pat. No. 2,903,982, dated Sep. 15, 1959, to D. W. Floy, details a "Liquid Fertilizer Attachment for a Corn Planter". The attachment includes a jet-pipe attached to a supply hose, which is, in turn, connected to a tank containing liquid fertilizer. The pipe is then projected through or into a corn planter runner and is adapted to apply a stream of liquid fertilizer simultaneously with planting of the corn. U.S. Pat. No. 2,968,266, dated Jan. 17, 1961, to A. W. Gastafson, details an "Apparatus for Treating Soil during Planting". The device includes equipment which is mounted on a conventional planting apparatus such that one device for mixing the chemicals may serve multiple rows by using planting apparatus and equipment driven by the power takeoff of a tractor. The planting apparatus forms a part of the equipment for mixing the chemicals with the soil. U.S. Pat. No. 2,990,186, dated Jun. 27, 1961, to E. S. Gandrud, details a "Device for Spreading Granular Material". The device includes a distributor head having vertically-disposed front and rear walls and downwardly-diverging sidewalls and defining an inlet opening in its upper end and an open bottom for discharging material. A baffle structure in the head between the inlet opening and the open bottom includes multiple baffle sections, wherein one of the generally vertical walls may be quickly and easily removed for easy access to the baffle section for adjustment and cleaning. The device is designed to spread granular material-in multiple rows over planted seeds in a field. A "Tube Connector" is detailed in U.S. Pat. No. 3,120,965, dated Feb. 11, 1964, to J. A. MacDonald. The tube connector is characterized by a connector device wherein a first tube can be connected to a second tube at any convenient level along the length of the ladder and at any point on the circumference, at that level. U.S. Pat. No. 3,399,638, dated Sep. 3, 1968, to J. E. Waldrum, et al, details an "Agricultural Spray Device". Disclosed is a low volume agricultural liquid spray device which includes a reservoir for the liquid to be sprayed and a feed mechanism to deliver the liquid under constant head to a spindle having a bore which defines a flow path. A spray device depends from the spindle and a drive system operates to rotate the spindle at a predetermined rate about its axis, wherein the spray device also rotates at the predetermined rate to dispense low volumes of agricultural liquid in a uniform, relatively coarse spray. U.S. Pat. No. 4,276,836, dated Jul. 7, 1981, to W. H. Pust, details a "Grain Drill Utilizing A Fertilizer Spout and Adjustable Deflector Therefor". The grain drill includes a furrow opener, a forwardly-disposed seed distribution spout, a rearwardly-disposed fertilizer spout and a deflector plate positioned beneath the fertilizer spout, so that a desired quantity of the fertilizer discharged from the lower end of the fertilizer spout is deflected laterally. The deflector plate is adjustable forwardly and rearwardly with respect to the seed distribution spout, so that the quantity of fertilizer flowing over the forward edge of the deflector plate can be controlled by the position of the forward edge of the deflector plate with respect to the seed distribution spout. A "Liquid Fertilizer Attachment" is detailed in U.S. Pat. No. 4,580,506, dated Apr. 8, 1986, to Matliew W. Fleischer, et al. The device includes a fertilizer knife adapted to be attached to a planter. A housing is adjustably attached to the fertilizer knife and an adjustable mechanism is provided for permitting the knife to be adjusted vertically with respect to the housing, thereby adjusting the effective depth that the fertilizer, in liquid form, will be released. The fertilizer knife is attached to the housing, wherein the fertilizer knife will accurately track in front of the line into which the seeds are being planted and this pivoting feature also permits the fertilizer knife to be deflected to one side or the other temporarily when rocks or other potentially damaging obstructions are encountered. The fertilizer knife has a leading edge extending from a point in close proximity to a vertical pivotal axis and tapers downwardly and rearwardly from that axis.

It is an object of this invention to provide a new and improved tube alignment bracket for aligning the insecticide/fungicide tube or tubes of a planter with the planter seed distribution tube or tubes to facilitate application of insecticide or fungicide in close proximity to the seeds as the seeds are sequentially deposited in furrows created by the planter.

Another object of this invention is to provide a new and improved tube alignment bracket for mounting on or extending integrally from the respective seed distribution tubes of a seed planter, accepting the discharge ends of the insecticide tubes and aligning the insecticide tubes in close proximity to the discharge end of the seed distribution tubes along the respective furrows to insure application of insecticide/fungicide granules from the insecticide tubes in the furrows in close proximity to the seeds as the seeds are deposited in the furrows.

Yet another object of this invention is to provide a plastic or fiberglass tube alignment bracket for aligning the discharge ends of the respective insecticide tubes and seed distribution tubes in a seed planter, which tube alignment bracket includes a bent bracket plate, one end of which is mounted on or shaped integrally with the respective seed distribution tubes and receives one end of a T-brace and the opposite end receiving the opposite end of the T-brace and shaped to define a cylindrical tube mount which stabilizes the respective insecticide tubes and positions the discharge ends of the insecticide tubes in close proximity to the discharge ends of the seed distribution tubes, for depositing the insecticide or fungicide granules in close proximity to the seeds when the seeds are deposited in a furrow.

SUMMARY OF THE INVENTION

These and other objects of the invention are provided in a new and improved, injection-molded, plastic tube alignment bracket for use in seed planters for the purpose of orienting the discharge end of the planter insecticide tube or tubes with the discharge end of the planter seed distribution tube or tubes. In a preferred embodiment the tube alignment bracket is characterized by a bracket plate having a bend spanned by a T-brace, one end of which bracket plate is provided with a pair of spaced slots for engaging corresponding nibs in the seed distribution tube(s) and is secured to a corresponding seed distribution tube using one or more tie straps or bands. The opposite end of the bracket plate is fitted with an angled, cylindrical or tubular tube mount for receiving the insecticide tube(s), to insure that insecticide or fungicide discharging from the insecticide tube(s) strikes the furrow in close proximity to, and in alignment with, seeds discharged in spaced sequence in the furrow from the seed distribution tube(s). The tube alignment bracket may also be fitted with a tie strap or band slot for receiving a tie strap or band and securing the tube alignment bracket to the corresponding seed discharge tube. Alternatively, the tube alignment bracket may be shaped integrally with the seed distribution tube.

BRIEF DESCRIPTION OF THE DRAWING

The invention will be better understood by reference to the accompanying drawing, wherein:

FIG. 1 is a perspective view, partially in section, of the seed distribution tube and insecticide tube of a typical conventional seed planter;

FIG. 2 is a perspective view of a preferred embodiment of the tube alignment bracket mounted on the seed discharge tube for connecting the seed distribution tube and insecticide tube of the conventional seed planter illustrated in FIG. 1;

FIG. 3 is an enlarged, perspective view of the tube alignment bracket illustrated in FIG. 2;

FIG. 4 is a side view of the tube alignment bracket of this invention molded integrally with the planter seed distribution tube; and FIG. 5 is a sectional view taken along line 5—5 of the tube alignment bracket illustrated in FIG. 3.

DESCRIPTION OF THE PREFERRED EMBODIMENTS

Referring initially to FIG. 1 of the drawing, the applicable seed distribution element of a typical conventional seed planter 10 includes an opening disc 12, a support wheel 14, an insecticide tube 15, attached to the planter frame 11 by means of an insecticide tube bracket 16 and a seed distribution tube 13. The seed planter 10 is pulled by a tractor (not illustrated) in the indicated direction of travel to create a furrow (not illustrated) having a furrow bottom centerline 19.

Referring now to FIGS. 2, 3 and 5, a first preferred embodiment of the tube alignment bracket of this invention is generally illustrated by reference numeral 1 and is mounted on the conventional seed tube 13, attached to the conventional planter 10. In this embodiment of the invention the tube alignment bracket 1 is characterized by a bracket plate 2 having a bend 9, which defines a tube mount segment 4, provided with a segment opening 4a which communicates with the mount bore 6a of a cylindrical or tubular tube mount 6, mounted on the end of the tube mount segment 4. An attachment segment 5 extends from the tube mount segment 4 at the bend 9 in the bracket plate 2 and is fitted with an upper longitudinal plate slot 3 and a lower longitudinal plate slot 3a, as illustrated. The upper longitudinal plate slot 3 and lower longitudinal plate slot 3a are designed to receive spaced tube nibs 13a, projecting from the seed tube 13 and a pair of pipe or tie straps 8 are looped tightly around the attachment segment 5 of the bracket plate 2 and the seed tube 13 in spaced relationship to removably secure the tube alignment bracket 1 on the seed tube 13. A tie strap slot 5a may be molded or cut in the attachment segment 5 of the bracket plate 2 between the upper longitudinal plate slot 3 and lower longitudinal plate slot 3a to receive one of the tie straps 8 and help secure the tube alignment bracket 1 to the seed distribution tube 13, as illustrated in FIG. 3. In a preferred embodiment of the invention, and especially where the tube alignment bracket 1 is injection-molded of a plastic material, a T-brace 7 spans the bend 9 in the bracket plate 2 and connects the tube mount segment 4 to the attachment segment 5 for strengthening purposes. The T-brace 7 is defined by a flat brace nib or plate 7a, capped by a brace flange 7b and may be molded integrally with the bracket plate 2, as described above.

Accordingly, the entire tube alignment bracket 1 may be injection-molded or otherwise shaped from a suitable plastic material such as polyethylene, polypropylene and most preferably, polyvinylchloride, with the T-brace 7 molded in place. The mount bore 6a of the angularly-mounted cylindrical tube mount 6 is designed to receive the discharge end 15a of the conventional insecticide tube 15, which is typically conventionally mounted on the planter frame 11 of the planter 10 by means of an insecticide tube bracket 16, as illustrated in FIG. 1.

To install the tube alignment bracket 1 on a seed distribution tube 13, the insecticide tube bracket 16 is first removed from the planter frame 11 and insecticide tube 15 and the discharge end 15a of the insecticide tube 15 is inserted in the mount bore 6a of the mount tube 6, as illustrated in FIGS. 2 and 3. Accordingly, the position of the insecticide tube 15 partially inside the tube mount 6 with respect to the tube discharge opening 13b of the seed distribution tube 13 allows aligned deposition of insecticide and/or fungicide granules 17 in a selected proximity to each seed 18 as the insecticide/fungicide granules 17 are dispensed from a hopper (not illustrated) through the insecticide tube 15 and the seeds 18 are sequentially dispensed through the seed distribution tube 13 and tube mount 6 of the tube alignment bracket 1.

Referring to FIG. 4 of the drawing, it will be appreciated that the tube alignment bracket 1 may be integrally shaped with the seed distribution tube 13 instead of mounted thereon as illustrated in FIGS. 2, 3 and 5. Accordingly, under these circumstances the tube mount 6 of the tube alignment bracket 1 is automatically positioned to receive the discharge end 15a of the insecticide tube 15 when each seed discharge tube 13 is installed on the seed planter 10.

In operation, referring again to FIG. 2 of the drawing, the planter 10 operates to initially open a furrow (not illustrated) along a furrow bottom centerline 19 in conventional manner by means of the opening disc 12. The seed distribution tube 13 is then utilized to distribute seeds 18 in a selected spaced sequence into the furrow along the furrow bottom centerline 19 by a suitable seed distribution mechanism in the seed planter 10 which is well known to those skilled in the art. Simultaneously, the insecticide tube 15 operates to dispense insecticide or fungicide granules 17 at the furrow bottom centerline 19 in close proximity to the seeds 18, to insure proper interaction with the roots of the emerging plants as the seeds 18 germinate. Conventional closing wheels (not illustrated) mounted on the planter 10 then close the furrow, covering the seeds 18 and insecticide granules 17 and effectively planting the seeds 18. Whether shaped integrally with, or mounted on the seed discharge tube 13, the tube alignment bracket 1 maintains the tube discharge opening 13b of the seed distribution tube 13 in a common vertical plane with, and spaced a selected distance from, the discharge end 15a of the insecticide tube 15 at all times during the planting operation. This function is assured since, referring again to FIGS. 2 and 3 of the drawing, the tube alignment bracket 1 is mounted on or projects integrally from the seed distribution tube 13 such that the segment opening 4a and mount bore 6a of the tube mount segment 4 and tube mount 6, respectively, are also located in a horizontal plane extending through the top of the tube discharge opening 13b, over the furrow bottom centerline 19. This location facilitates continuous deposition of the insecticide or fungicide or insecticide pellets or granules 17 directly on the furrow bottom centerline 19 without scattering the pellets or granules, in consistently proper proximity to, and alignment with, the seeds 18, which are dispensed from the lower portion of the tube discharge opening 13b, as the seed planter 10 moves in the indicated direction of travel.

It will be appreciated by those skilled in the art that while a preferred material of construction for the tube alignment bracket 1 of this invention is a plastic material capable of being injection-molded, other materials such as wood, fiberglass, metal and the like, in non-exclusive particular, may also be used. Furthermore, referring again to FIGS. 3 and 5 of the drawing, the T-brace 7, illustrated in FIG. 5, is preferred for use in the tube alignment bracket configuration, especially under circumstances where the tube alignment bracket 1 is constructed of plastic such as polyvinylchloride or polyethylene, in non-exclusive particular to stiffen and strengthen the bracket plate 2. These strengthening features are designed to allow dirt to be removed from the area of the bend 9 and prevent compacting. However, under circumstances where the tube alignment bracket 1 is constructed of metal, the T-brace 7 can be eliminated in favor of an unsupported and unreinforced bracket plate 2.

While the preferred embodiments of the invention have been described above, it will be recognized and understood that various modifications can be made without departing from the spirit and scope of the invention.

Accordingly, having described my invention with the particularity set forth above, what is claimed is:

1. A tube alignment bracket for mounting on a seed distribution tube, having multiple spaced projecting nibs, of a seed planter and locating an insecticide/fungicide tube carried by the seed planter in selected fixed proximity with respect to the seed distribution tube, said tube alignment bracket comprising a plate defining an attachment segment carried by the seed distribution tube, a pair of longitudinal plate slots provided in said attachment segment in spaced relationship for receiving two of the nibs and at least one tie strap encircling said attachment segment and the seed distribution tube for removably mounting said tube alignment bracket on the seed distribution tube, a tube mount segment extending from said attachment segment, a tube mount carried by said tube mount segment in angular relationship with respect to said tube mount segment for receiving the insecticide/fungicide tube and a T-brace connecting said attachment segment to said tube mount, whereby the discharge end of the insecticide/fungicide tube is located in said selected fixed proximity with respect to the discharge end of the seed distribution tube.

2. The tube alignment bracket of claim 1 further comprising a bend provided in said plate, said bend further defining said attachment segment and said tube mount segment and a band slot provided in said attachment segment for receiving said tie strap.

3. The tube alignment bracket of claim 2 wherein said tube mount is cylindrical and defines an internal bore and further comprising a plate opening provided in said tube mount segment of said plate, said plate opening located in communication with said internal bore of said tube mount for dispensing insecticide/fungicide through the insecticide/fungicide tube into said internal bore and through said plate opening to the ground in close proximity to seeds dispensed to the ground through the seed distribution tube.

4. A tube alignment bracket integrally formed in a seed distribution tube of a seed planter for locating an insecticide/fungicide tube carried by the seed planter into selected fixed proximity to the seed distribution tube, said tube alignment bracket comprising a tube mount projecting in an angular relationship from the seed distribution tube, said tube mount comprising a cylindrical tube mount segment defining an internal bore and further comprising a plate provided with a plate opening, said plate opening located in communication with said internal bore of said cylindrical tube mount segment for dispensing insecticide/fungicide through the insecticide/fungicide tube into said internal bore and through said plate opening to the ground in close proximity to seeds dispensed to the ground through the seed distribution tube, and a T-brace connecting the seed distribution tube and said cylindrical tube mount segment, whereby the discharge end of the insecticide/fungicide tube is inserted in said cylindrical tube mount segment and located in close proximity to the discharge end of the seed distribution tube.

* * * * *